US010855946B2

(12) United States Patent
Okajima et al.

(10) Patent No.: US 10,855,946 B2
(45) Date of Patent: Dec. 1, 2020

(54) SEMICONDUCTOR INTEGRATED CIRCUIT, DISPLAY DEVICE PROVIDED WITH SAME, AND CONTROL METHOD

(71) Applicant: Socionext Inc., Kanagawa (JP)

(72) Inventors: Yoshinori Okajima, Osaka (JP);
Masaki Toyokura, Hyogo (JP);
Masayuki Taniyama, Osaka (JP);
Masahiro Takeuchi, Osaka (JP);
Takashi Akiyama, Osaka (JP)

(73) Assignee: SOCIONEXT INC., Kanagawa (JP)

( * ) Notice: Subject to any disclaimer, the term of this patent is extended or adjusted under 35 U.S.C. 154(b) by 3 days.

(21) Appl. No.: 15/374,534

(22) Filed: Dec. 9, 2016

(65) Prior Publication Data

US 2017/0127011 A1    May 4, 2017

Related U.S. Application Data

(63) Continuation of application No. PCT/JP2015/002893, filed on Jun. 10, 2015.

(30) Foreign Application Priority Data

Jun. 10, 2014   (JP) .................................. 2014-119586

(51) Int. Cl.
*H04N 5/445*      (2011.01)
*G09G 5/14*       (2006.01)
(Continued)

(52) U.S. Cl.
CPC .......... *H04N 5/44591* (2013.01); *G09G 5/14* (2013.01); *H04N 13/279* (2018.05);
(Continued)

(58) Field of Classification Search
CPC .......... H04N 13/0484; H04N 13/0468; H04N 13/047; H04N 13/0445; H04N 13/0014;
(Continued)

(56) References Cited

U.S. PATENT DOCUMENTS

| 2002/0141650 | A1* | 10/2002 | Keeney | ............... | H04N 19/115 |
| | | | | | 382/239 |
| 2003/0194141 | A1* | 10/2003 | Kortum | ............... | H04N 19/162 |
| | | | | | 382/239 |

(Continued)

FOREIGN PATENT DOCUMENTS

| JP | 1-141479 A  | 6/1989 |
| JP | 4-302381 A  | 10/1992 |

(Continued)

OTHER PUBLICATIONS

English Translation of International Search Report issued in International Application No. PCT/JP2015/002893, dated Sep. 1, 2015.

(Continued)

*Primary Examiner* — Michael Lee
*Assistant Examiner* — Mustafizur Rahman
(74) *Attorney, Agent, or Firm* — McDermott Will & Emery LLP

(57) ABSTRACT

Disclosed herein is a semiconductor integrated circuit which controls the quality of an image and includes a viewer detector, a region specifier, and a controller. The viewer detector detects the number of viewer(s) watching the image and a gaze region being watched by the viewer within the image. If the number of viewers is plural, the region specifier specifies a local region of the image as a target region based on a plurality of gaze regions being watched by the viewers. The controller performs image quality control on the target region.

19 Claims, 14 Drawing Sheets

(51) Int. Cl.

| | | |
|---|---|---|
| *H04N 13/398* | (2018.01) | |
| *H04N 21/442* | (2011.01) | |
| *H04N 21/4402* | (2011.01) | |
| *H04N 13/296* | (2018.01) | |
| *H04N 13/279* | (2018.01) | |
| *H04N 21/4223* | (2011.01) | |
| *H04N 13/368* | (2018.01) | |
| *H04N 13/383* | (2018.01) | |

(52) U.S. Cl.
CPC ......... *H04N 13/296* (2018.05); *H04N 13/368* (2018.05); *H04N 13/383* (2018.05); *H04N 13/398* (2018.05); *H04N 21/4223* (2013.01); *H04N 21/44218* (2013.01); *H04N 21/440245* (2013.01); *H04N 21/440254* (2013.01); *H04N 21/440263* (2013.01); *G09G 2320/0261* (2013.01); *G09G 2340/0407* (2013.01); *G09G 2354/00* (2013.01)

(58) Field of Classification Search
CPC ........... H04N 13/0018; H04N 5/44591; H04N 13/368; H04N 13/383; G09G 5/14; G09G 2354/00
USPC ........ 348/576, 565, 563, 274, 222.1, 78, 59, 348/54, 51, 50, 49, 48, 46, 43, 42, 14.07, 348/14.12; 345/156, 173, 419, 427; 351/209, 210, 218, 240
See application file for complete search history.

(56) References Cited

U.S. PATENT DOCUMENTS

| | | | |
|---|---|---|---|
| 2007/0162922 A1 | 7/2007 | Park | |
| 2010/0162285 A1* | 6/2010 | Cohen | H04H 60/31 725/12 |
| 2010/0321482 A1* | 12/2010 | Cleveland | G06F 3/012 348/78 |
| 2011/0032274 A1 | 2/2011 | Miyata | |
| 2011/0050656 A1 | 3/2011 | Sakata et al. | |
| 2011/0228051 A1* | 9/2011 | Dedeoglu | H04N 13/0022 348/46 |
| 2012/0062551 A1* | 3/2012 | Lee | H04N 13/0018 345/419 |
| 2012/0066705 A1 | 3/2012 | Harada et al. | |
| 2012/0146891 A1* | 6/2012 | Kalinli | H04N 19/115 345/156 |
| 2012/0254717 A1* | 10/2012 | Dey | G06F 17/30038 715/230 |
| 2012/0300061 A1* | 11/2012 | Osman | G06F 1/3231 348/135 |
| 2013/0050197 A1* | 2/2013 | Oosawa | H04N 13/0402 345/419 |
| 2013/0125155 A1* | 5/2013 | Bhagavathy | H04N 21/2343 725/10 |
| 2013/0232062 A1* | 9/2013 | Leventhal | G06Q 10/1053 705/39 |
| 2013/0290993 A1* | 10/2013 | Cheung | H04N 21/4143 725/10 |
| 2013/0336552 A1* | 12/2013 | Sehnert | A61B 6/469 382/128 |
| 2014/0177906 A1* | 6/2014 | Horowitz | H04N 5/23238 382/103 |
| 2014/0232638 A1* | 8/2014 | Choi | G06F 3/013 345/156 |
| 2014/0247215 A1* | 9/2014 | George-Svahn | G06F 3/02 345/158 |
| 2014/0267602 A1* | 9/2014 | Tzur | H04N 13/0018 348/43 |
| 2014/0320688 A1* | 10/2014 | Skogo | H04N 13/0484 348/222.1 |
| 2015/0123919 A1* | 5/2015 | Yamada | G06F 3/013 345/173 |
| 2015/0325008 A1* | 11/2015 | Scarff | G06T 11/001 345/605 |
| 2015/0331486 A1* | 11/2015 | Okubo | G06F 3/0346 345/156 |
| 2016/0080729 A1* | 3/2016 | Watanabe | G03B 35/24 348/54 |
| 2016/0360267 A1* | 12/2016 | Marilly | G06F 3/013 |

FOREIGN PATENT DOCUMENTS

| | | |
|---|---|---|
| JP | 2005-130251 A | 5/2005 |
| JP | 2006-119408 A | 5/2006 |
| JP | 2012-138823 A | 7/2012 |
| JP | 2013-055675 A | 3/2013 |
| WO | 2009/125481 A1 | 10/2009 |
| WO | 2010/070882 A1 | 6/2010 |
| WO | 2010/143388 A1 | 12/2010 |
| WO | 2015/106882 A1 | 7/2015 |

OTHER PUBLICATIONS

Office Action issued in Chinese Application No. 201580030685.7 dated Sep. 30, 2018, with partial English translation.
Office Action dated May 14, 2019 issued in the corresponding Japanese Application No. 2016-527641; with partial translation.
Notice of Reasons for Refusal issued in Japanese Application No. 2019-128177 dated Sep. 23, 2020; with English translation.

* cited by examiner

SEMICONDUCTOR INTEGRATED CIRCUIT, DISPLAY DEVICE PROVIDED WITH SAME, AND CONTROL METHOD

CROSS-REFERENCE TO RELATED APPLICATIONS

This is a continuation of International Application No. PCT/JP2015/002893 filed on Jun. 10, 2015, which claims priority to Japanese Patent Application No. 2014-119586 filed on Jun. 10, 2014. The entire disclosures of these applications are hereby incorporated by reference.

BACKGROUND

The present disclosure relates to a semiconductor integrated circuit for use in, e.g., display devices, and more particularly, to a technique for reducing power consumption.

Nowadays, video displayed on display devices such as TV sets and displays is coming to have increasingly high definition. To achieve such higher video quality, display devices are required to perform a wider variety of processing and have enhanced performance Such processing to improve the video quality results in increased cost of circuits and increased power consumption, which is a problem. In particular, the larger the screen size of a display device is, the more significantly the cost and power consumption will increase.

To deal with such problems, a method of performing necessary processing on only a portion of a given screen, not on the entire screen, has been studied.

For example, Japanese Unexamined Patent Publication No. H01-141479 discloses a device configured to perform encoding processing, not by uniformly allocating the same bit rate to the entire on-screen image, but by applying, based on the viewer's eye direction, a larger amount of information to only a particular portion of the image to which he or she is directing his or her eyes.

Also disclosed is a technique for performing stereoscopic video processing when only one viewer is watching the video, whereas not performing such processing when two or more viewers are watching it (see, e.g., Japanese Unexamined Patent Publication No. 2013-055675).

SUMMARY

The technique of Japanese Unexamined Patent Publication No. H01-141479 is applicable to a situation where only one viewer is watching the video. Thus, if the technique of Japanese Unexamined Patent Publication No. H01-141479 was combined with the technique of Japanese Unexamined Patent Publication No. 2013-055675, a portion of the on-screen image would not be processed in a situation where two or more viewers are watching the video. That is to say, when two or more viewers are watching video on, e.g., a TV set, the combination of these two techniques would lead to failure to perform necessary processing on the entire screen. In that case, it would be difficult for each viewer to watch the video appropriately.

Conversely, performing necessary processing on the entire image on the screen regardless of the number of viewers watching it could possibly cause an increase in power consumption and cost.

In view of the foregoing background, it is therefore an object of the present disclosure to provide a semiconductor integrated circuit capable of appropriately performing necessary processing on an image even if two or more viewers are watching the same image and cutting down the power consumption and costs.

To overcome the problem described above, the present disclosure provides the following solution. Specifically, a semiconductor integrated circuit for controlling the quality of an image includes a viewer detector, a region specifier, and a controller. The viewer detector detects the number of viewer(s) watching the image and a gaze region being watched by the viewer within the image. If the number of viewers is plural, the region specifier specifies a local region of the image as a target region based on a plurality of gaze regions being watched by the viewers. The controller performs image quality control on the target region.

According to this configuration, even if the number of viewers is plural, a local region of the image is specified as a target region based on gaze regions determined by, e.g., the eye or face directions of the viewers. Furthermore, the target region may be subjected to, e.g., image quality improvement processing that allows the viewer to recognize his or her target region more easily.

The target region may be identical with any of the gaze regions, or may also be a region in which some of the gaze regions overlap with each other. The image quality control processing may be performed just locally on the target region, not on the entire image on the screen. This may reduce not only the area of the range to be processed but also the required processing performance as well or may reduce the area of the range to be processed to reduce the required processing performance, which thus leads to a significant reduction in the power consumption and costs of the semiconductor integrated circuit.

Also, a display device according to the present disclosure includes the semiconductor integrated circuit. Thus, the power consumption and costs of the display device may also be reduced.

The present disclosure provides a semiconductor integrated circuit capable of appropriately performing necessary processing on an image even if two or more viewers are watching the same image and cutting down the power consumption and costs.

DETAILED DESCRIPTION

First Embodiment

Figure 1:
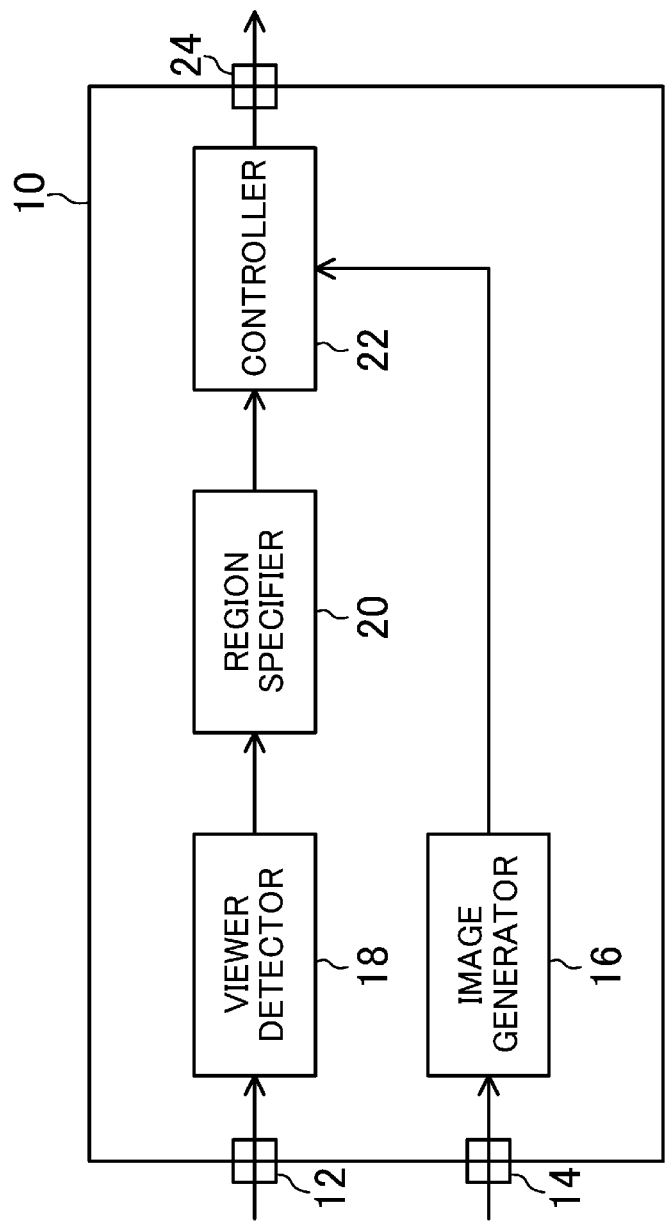
FIG. 1 is a block diagram of a semiconductor integrated circuit according to a first embodiment.

FIG. 1 is a block diagram of a semiconductor integrated circuit according to a first embodiment. A semiconductor integrated circuit 10 is configured to control the quality of an image (which may be a moving picture but will be hereinafter simply referred to as an "image") displayed on a display device such as a TV set. The semiconductor integrated circuit 10 includes an information input unit 12, a display information input unit 14, an image generator 16, a viewer detector 18, a region specifier 20, a controller 22, and an output unit 24.

The information input unit 12 receives information about an image to be displayed on the display device. This information includes viewer information about viewer(s). The viewer information includes, e.g., the number of the viewers and a gaze region or gaze regions, and may be obtained from an imaging device such as a camera.

The information input unit 12 may also receive viewer information from, e.g., a sensor, a pair of dedicated glasses, or a speech recognizer. Examples of the viewer information may include information about his or her brain wave, heart rate, blood pressure, age, and gender, information about his or her feeling or emotion (e.g., his or her facial expression), the distance from the display device to him or her, and the amount of time for which he or she is watching the gaze region (which time will be hereinafter referred to as a "gaze time").

The display information input unit 14 receives display information to be output to the display device. The display information may include, e.g., information about the image, compressed broadcast information, and character information transmitted from a network, or may also be information which can be displayed on the display device (e.g., a still picture).

The image generator 16 generates, based on the display information, image information to be displayed on the display device and outputs it. That is to say, if the output of the image generator 16 is supplied directly to the display device, a normal image will be displayed on the display device.

The image information may include character information or any other kind of non-image information.

Also, for example, the display information input unit 14 may form an integral part of the image generator 16, and the image generator 16 may be provided outside the semiconductor integrated circuit 10 such that its output is supplied to the semiconductor integrated circuit 10.

The viewer detector 18 may detect an arbitrary kind of information included in the viewer information. For example, the viewer detector 18 may detect, e.g., the number of the viewers and the gaze region indicating a particular region being watched by the viewer within the image. The gaze region may be a region having a predetermined range within the image and having its center defined by a point at which the viewer is fixing his or her eyes, for example.

The viewer detector 18 may detect the gaze region by reference to, in addition to or instead of the viewer's eye direction, his or her face orientation or any other piece of information included in the viewer information.

The information input unit 12 may form an integral part of the viewer detector 18.

The region specifier 20 specifies, as a target region, a local region of the image based on the number of the viewers and the gaze region that have been detected by the viewer detector 18.

The target region may be a local region of the image to which one or more viewers pay particular attention. For example, if there are a plurality of gaze regions (viewers), each of the gaze regions may possibly be a target region, and either a region in which some of the gaze regions overlap with each other at least partially or any one of the gaze regions may be specified as the target region.

The region specifier 20 may take any other piece of information, such as the distance and/or a gaze time, included in the output of the viewer detector 18 into account in the processing step of specifying the target region. The output of the image generator 16 may also be supplied to the region specifier 20. In that case, for example, the region specifier 20 may specify the target region in consideration of image information including character information as well.

The controller 22 performs, as image quality control of the target region within the image information output from the image generator 16, such processing that will make the target region more easily viewable for the viewer, for example. That is to say, the region subjected to the image quality control by the controller 22 is not the entire image on the screen, but only a local region that would attract multiple viewers' attention deeply. The reason is that viewers generally tend to view only a local region (e.g., a region including their object of interest) of an image more attentively. Accordingly, the controller 22 may perform, e.g., image quality improvement processing on the target region to allow the target region to have higher image quality than the rest of the image. Examples of the image quality improvement processing include improvement in definition using frequency information, and improvement in reproducibility of color information.

The output unit 24 outputs output image information subjected to the image quality control by the controller 22. The output unit 24 may form an integral part of the controller 22.

The output image information is then actually displayed on the display device.

Next, it will be described, with reference to FIG. 2, generally how the semiconductor integrated circuit 10 according to this embodiment performs processing.

Figure 2:
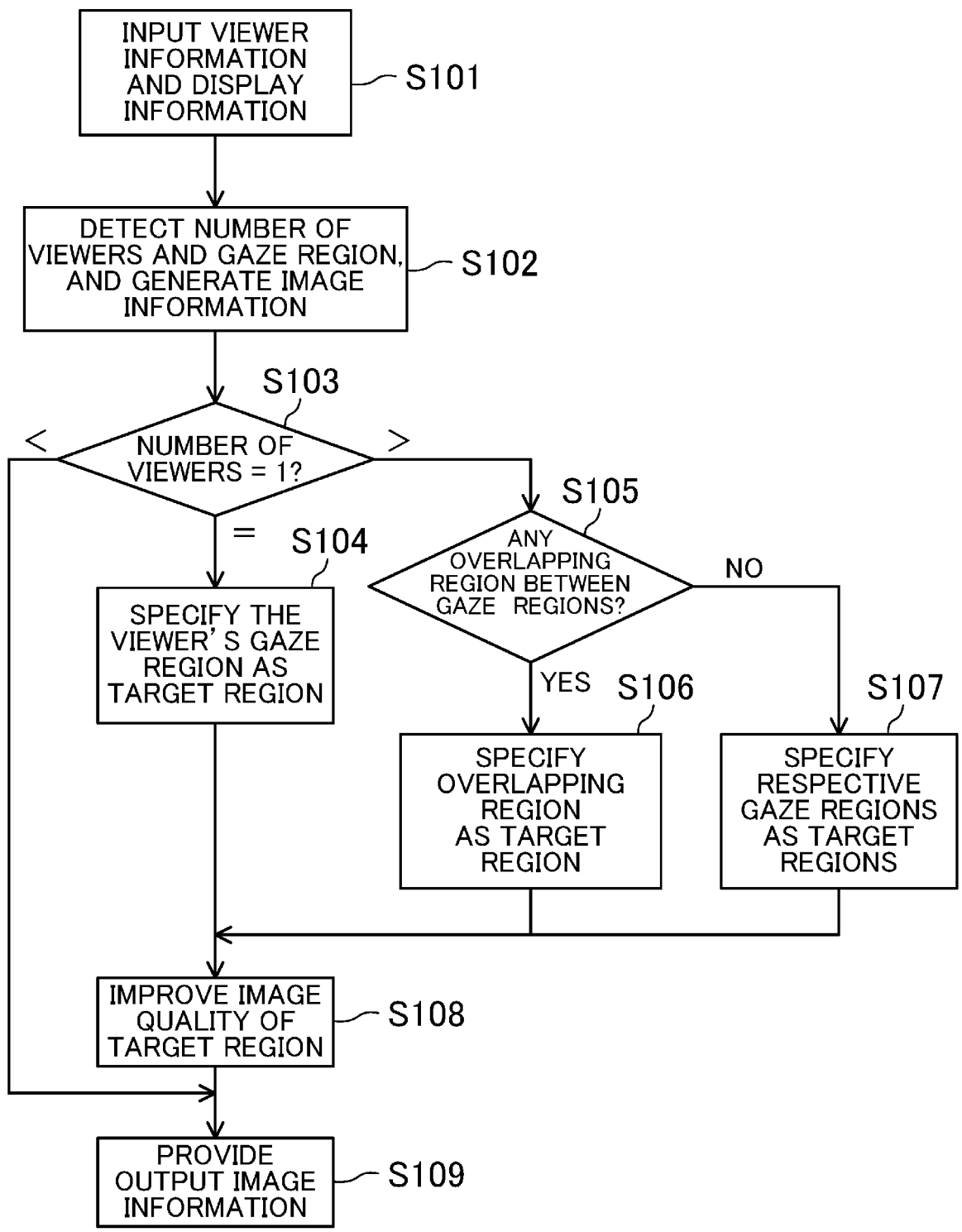
FIG. 2 is a flowchart showing exemplary processing of a semiconductor integrated circuit according to the first embodiment.

FIG. 2 is a flowchart showing exemplary processing of the semiconductor integrated circuit according to the first embodiment.

In Step S101, viewer information and display information are input to the semiconductor integrated circuit 10.

In Step S102, the number of viewers and a gaze region are detected based on the viewer information. Also, image information is generated based on the display information.

In Step S103, the number of viewers is determined.

If the number of viewers is less than one, i.e., if there are no viewers, then there are no gaze regions. Thus, no target regions are specified, and the process proceeds to Step S109. Accordingly, the image is not subjected to the image quality control, and thus the entire image keeps its original image quality (for example, low image quality).

If the number of viewers is singular, his or her gaze region is specified as a target region in Step S104.

On the other hand, if the number of viewers is plural, a determination is made in Step S105 whether or not any of their respective gaze regions has a region overlapping with another gaze region.

If there is any overlapping region (i.e., if the answer to the question of Step S105 is YES), the overlapping region is specified as the target region in Step S106.

On the other hand, if there are no overlapping regions (i.e., if the answer to the question of Step S105 is NO), the respective gaze regions are specified as the target regions in Step S107.

When the target region(s) is/are specified, the target region(s) is/are subjected, in Step S108, to image quality control such as image quality improvement processing to generate output image information. If there are plural target regions, the image quality control is performed on each of those regions.

Then, in Step S109, the output image information is provided from the semiconductor integrated circuit 10.

As can be seen, according to the semiconductor integrated circuit 10 of this embodiment, even if two or more viewers are watching the same image, the image generated may have been subjected to such image quality control that would make the image viewable for each viewer to his or her preference.

Japanese Unexamined Patent Publication No. H01-141479 discloses a technique for weighting encoding processing of an image according to the viewers' eye directions. Japanese Unexamined Patent Publication No. 2013-055675 discloses a technique for performing stereoscopic processing on an image only when a single viewer is watching the image without performing such processing when two or more viewers are watching the image.

Thus, a simple combination of the two techniques of Japanese Unexamined Patent Publications No. H01-141479 and No. 2013-055675 would result in failure to process the image if two or more viewers are watching the image. In addition, none of these techniques explicitly teach, if two or more viewers are watching the image, how to specify a local region of the image, or subjecting that region to some image quality control such as image quality improvement.

In contrast, according to this embodiment, the image quality control is always performed on the target region regardless of the number of viewers. This allows the respective viewers to watch the image to his or her preference.

In addition, the image quality control such as image quality improvement processing may be performed on only a local region of the image (i.e., the target region), not the entire image on the screen, and thus, the area of the range to be processed may be narrowed. This may reduce power consumption. Also, such a reduction in the area of the range to be subjected to the image quality control may require lower processing performance than in a situation where the image quality control is performed on the entire image. This may reduce costs and a circuit size.

Optionally, to further reduce power consumption and for other purposes, not all of the respective gaze regions have to be specified in Step S107 as the target regions. That is to say, only a region in which some of the gaze regions overlap with each other may be specified as the target region.

In this embodiment, any other piece of information included in the output of the viewer detector 18 may also be taken into account during the processing to be performed until the target region is specified. Thus, some variations will be described below.

First Processing Example

Figure 3:
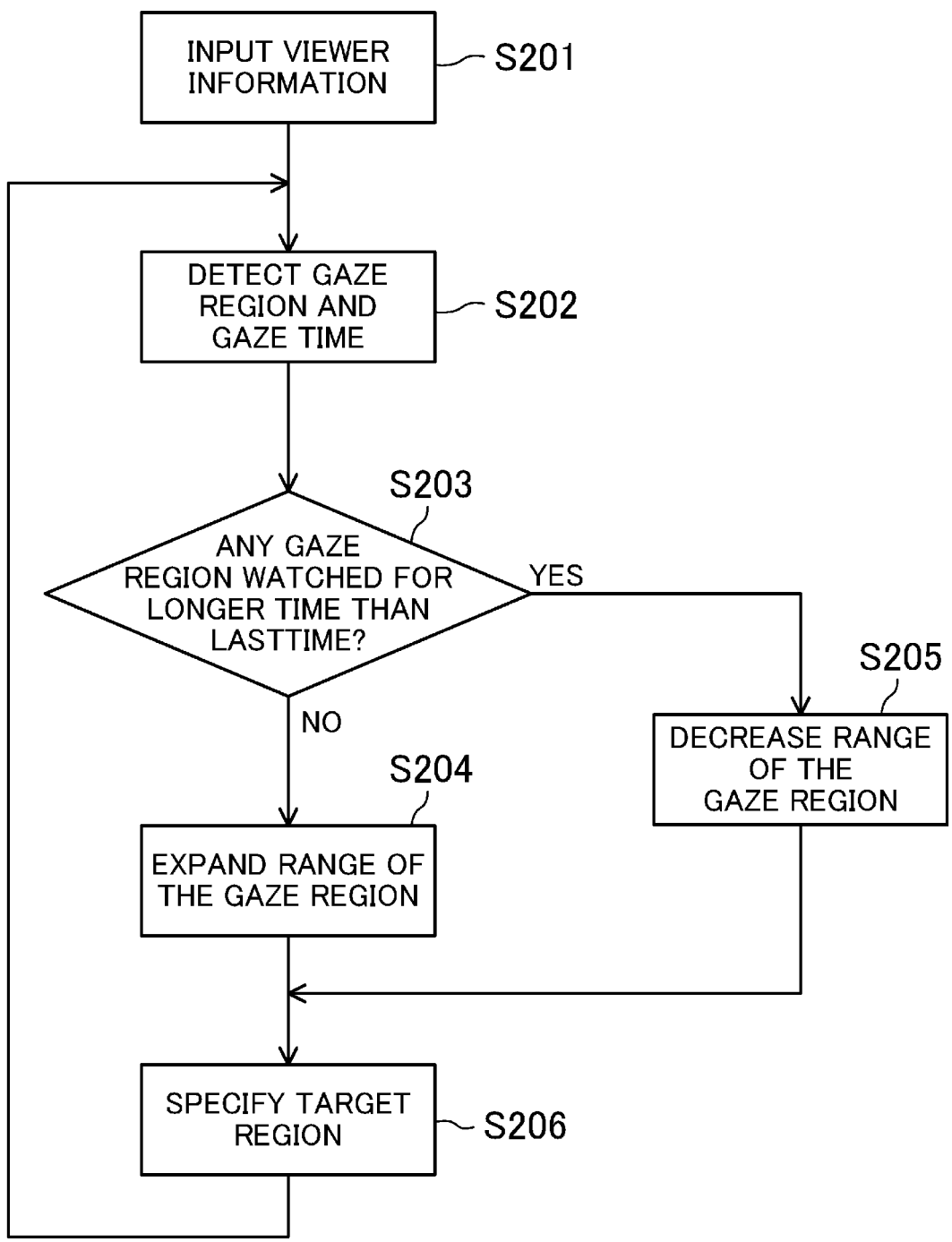
FIG. 3 is a flowchart showing a first processing example to be performed until a target region is specified.

FIG. 3 is a flowchart showing a first processing example to be performed until a target region is specified. The flowchart of FIG. 3 shows an example in which a gaze time is used as a parameter. Note that it will not be described how to detect the number of viewers in this example.

In Step S201, viewer information is input.

In Step S202, the gaze region and the gaze time are detected based on the viewer information.

In Step S203, a determination is made whether or not there is any gaze region being watched by the viewer for a longer time than the last time. That is to say, a determination is made whether or not there is any gaze region being watched by the viewer more attentively.

If there are no gaze regions continuously watched for a longer time (i.e., if the answer to the question of Step 203 is NO), the range (area) of the gaze region is expanded in Step S204. That is to say, it cannot be said that the viewer is watching the gaze region attentively, and thus, the gaze region is not a candidate for the target region.

If there is any gaze region continuously watched for a longer time (i.e., if the answer to the question of Step 203 is YES), the range (area) of the gaze region is decreased in Step S205. That is to say, the viewer is watching the gaze region more attentively, and thus, the gaze region may be regarded as a candidate for the target region.

In Step S206, the target region is specified based on the results of Steps S204 and S205. For example, a gaze region having a predetermined area or less may be specified as a target region.

After that, the same series of processing steps will be repeatedly performed. Optionally, the area of the target region may be increased or decreased according to the length of the gaze time after the target region has been specified from among the gaze regions. In other words, the gaze time may be included as parameters for determining the target region.

This further narrows down the target range of the image quality control, and thus results in a further reduction in power consumption and costs.

Second Processing Example

Figure 4:
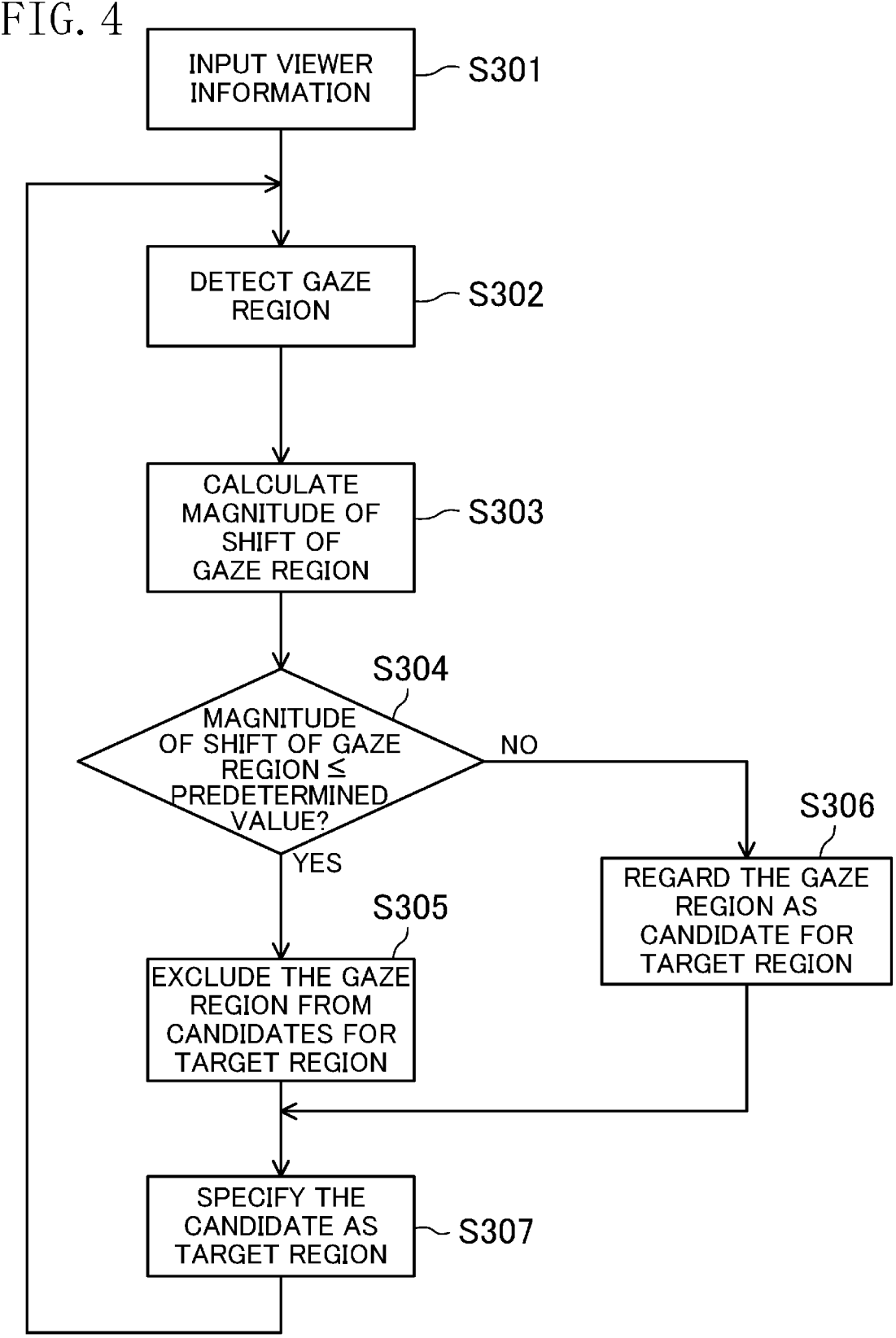
FIG. 4 is a flowchart showing a second processing example to be performed until a target region is specified.

FIG. 4 is a flowchart showing a second processing example to be performed until a target region is specified. The flowchart of FIG. 4 shows an example in which shift of a gaze region within the image is used as a parameter. Note that it will not be described how to detect the number of viewers in this example In Step S301, viewer information is input.

In Step S302, the gaze region is detected based on the viewer information.

In Step S303, the magnitude of shift of the gaze region within the image is calculated. That is to say, this shows how much the gaze region has shifted within the image.

In Step S304, a determination is made whether or not the magnitude of shift of the gaze region is equal to or more than a predetermined value.

If the magnitude of shift of the gaze region is equal to or more than the predetermined value (i.e., if the answer to the question of Step S304 is YES), the gaze region is excluded from candidates for the target region in Step S305.

On the other hand, if the magnitude of shift of the gaze region is less than the predetermined value (i.e., if the answer to the question of Step S304 is NO), the gaze region is regarded as a candidate for the target region in Step S306.

In Step S307, the target region is specified based on the results of Steps S305 and S306.

After that, the same series of processing steps will be repeatedly performed. As can be seen, even in a situation where the gaze region shifts along with the movement of the viewer's eyes, it can be said that the gaze region is shifting relatively slowly as long as his or her eye movement falls within a predetermined range. Thus, the gaze region may be regarded as remaining at a fixed location within the image for a predetermined amount of time, and therefore, may be specified as the target region.

This may achieve the same or similar advantage as/to the first processing example.

The semiconductor integrated circuit 10 may be provided with a memory or any other storage device to make the determination in Steps S203 and S304.

Third Processing Example

Figure 5:
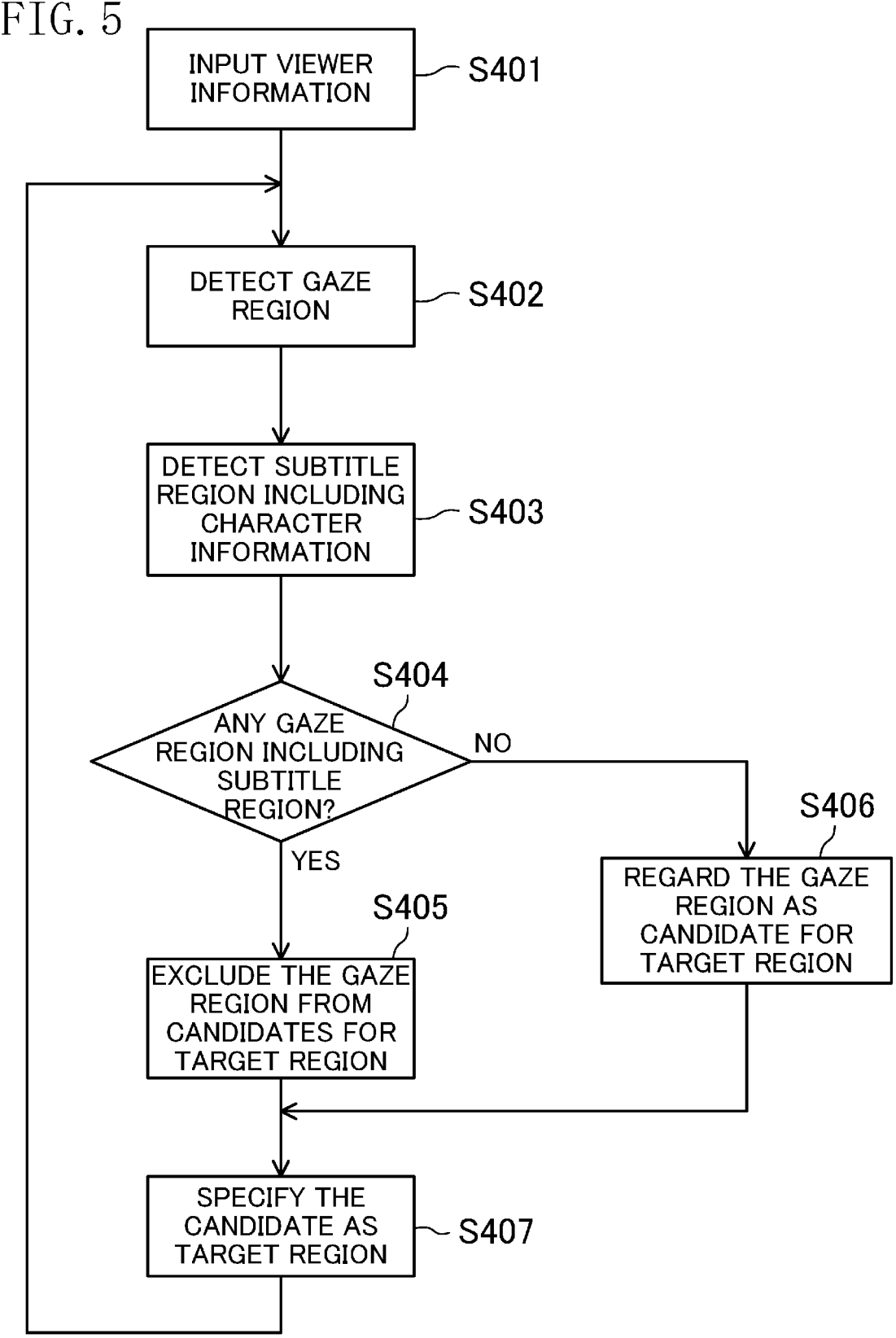
FIG. 5 is a flowchart showing a third processing example to be performed until a target region is specified.

FIG. 5 is a flowchart showing a third processing example to be performed until a target region is specified. The flowchart shows an example in which the gaze region includes character information such as movie subtitles and on-screen display (OSD). In this example, an image to be processed is a background image to be synthesized with the character information. "A subtitle region including character information" refers herein to a region of the background image existing on the synthesized image and corresponding to a region including subtitles. That is to say, the synthesized image of the character information and the background image is not the image to be processed. This is because it would be beneficial to perform the image processing on the premise that only the image quality of the background image should be controllable, considering the fact that the background image with a relatively low image quality would allow the viewer to read the character information more easily in the vicinity of the region where the subtitles or OSD is/are synthesized with the background image. Note that it will not be described how to detect the number of viewers in this example.

In Step S401, viewer information is input.

In Step S402, a gaze region is detected based on the viewer information.

In Step S403, a subtitle region including character information such as movie subtitles or weather forecast is detected. Steps S402 and S403 may be performed in reverse order.

In Step S404, a determination is made whether or not there is any gaze region including any subtitle region. That is to say, a determination is made whether or not the viewer is watching any subtitle region.

If there is any gaze region including a subtitle region (i.e., if the answer to the question of Step S404 is NO), the gaze region is excluded from candidates for the target region in Step S405.

On the other hand, if there are no gaze regions including any subtitle regions (i.e., if the answer to the question of Step S404 is YES), the gaze region is regarded as a candidate for the target region in Step S406.

In Step S407, the target region is specified based on the results of Steps S405 and S406.

After that, the same series of processing steps will be repeatedly performed. As can be seen, if the gaze region and the subtitle region at least partially overlap with each other, excluding the gaze region from the target regions further narrows down the target range of the image quality control. That is because it can be said that the image quality improvement or any other image quality control is required less often for characters in an image than for persons and other subjects in the image.

This may achieve the same or similar advantage as/to the first processing example.

In the first to third processing examples, other pieces of information included in the viewer information may also be used as parameters until the target information is specified.

For example, the shape of the gaze region may be changed in accordance with the viewer posture information that has been input. Also, viewer's speech information or biological information about his or her brain wave, heart rate, or blood pressure may also be input to analyze the target watched by the viewer. For example, information about the viewer's feeling or emotions may be acquired based on his or her facial expressions, and based on the information thus acquired, the degree of importance of the image (in particular, the target that the viewer is watching) may be calculated to weight a plurality of target regions. In this case, the image quality may be controlled in accordance with those weights.

Optionally, any other piece of personal information about the viewer such as his or her age or gender may also be used as a parameter for specifying the target region.

The target region may also be specified by combining the first to third processing examples with one another.

Second Embodiment

Figure 6:
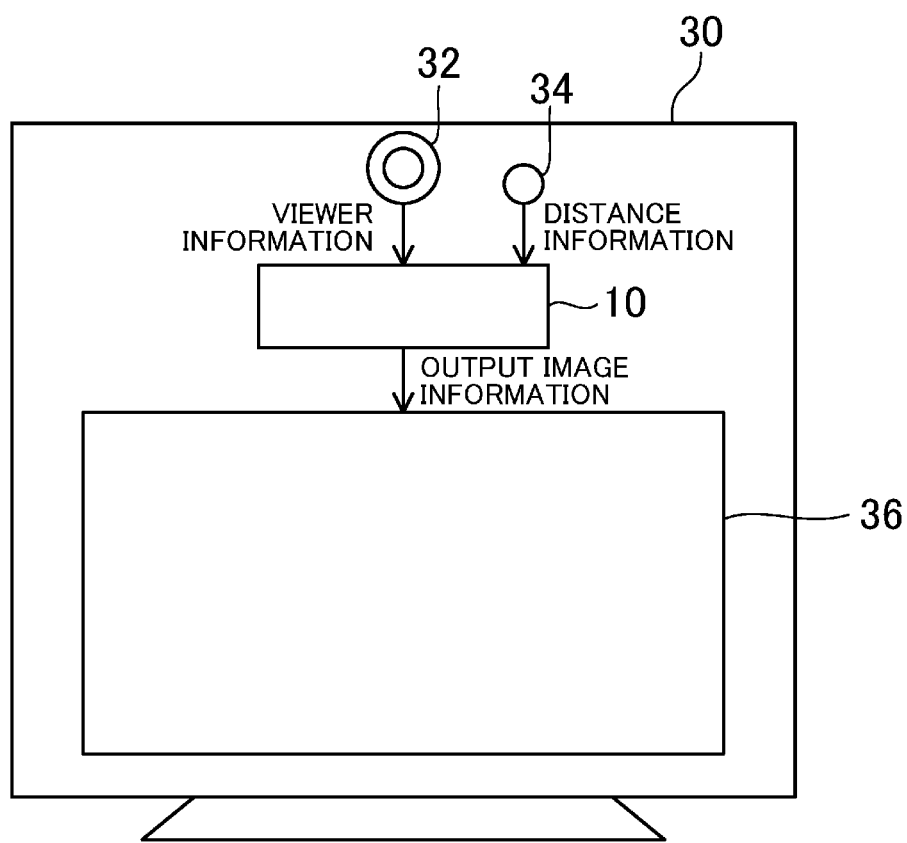
FIG. 6 is a schematic diagram illustrating a display device according to a second embodiment.

FIG. 6 is a schematic diagram illustrating a display device according to a second embodiment. For example, a display device 30 configured as a digital TV set includes the semiconductor integrated circuit 10 of the first embodiment, an imaging device 32, a distance measuring sensor 34, and a display unit 36.

The imaging device 32 may be, e.g., a camera that captures an image of a viewer watching the image on the display unit 36, and may output viewer information to the semiconductor integrated circuit 10.

The distance measuring sensor 34 measures the distance between the display unit 30 and the viewer, and outputs distance information to the semiconductor integrated circuit 10. Optionally, the imaging device 32 may be configured to have the function of the distance measuring sensor 34.

The display unit 36 receives output image information from the semiconductor integrated circuit 10 to display an image with quality which has been controlled to the viewer's preference.

The semiconductor integrated circuit 10 receives display information via an antenna which is not illustrated.

The image displayed on the display unit 36 of the display device 30 having such a configuration also has a gaze region and a target region to be described in detail below. Note that the semiconductor integrated circuit 10, the imaging device 32, and the distance measuring sensor 34 are not illustrated in any of the drawings to be referred to in the following examples.

First Example

Figure 7:
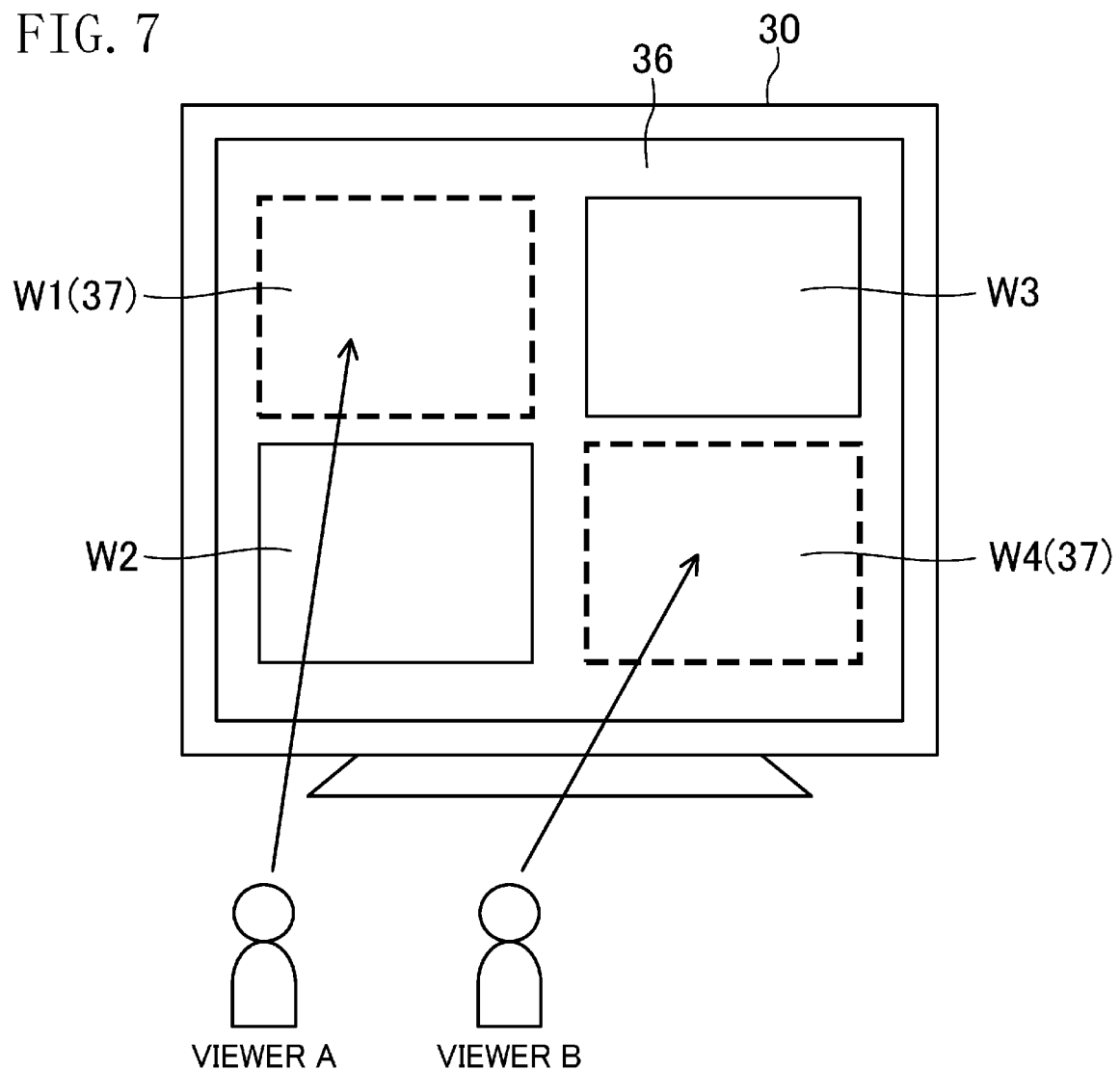
FIG. 7 illustrates how a first exemplary set of gaze and target regions may be viewed in one situation.
Figure 8:
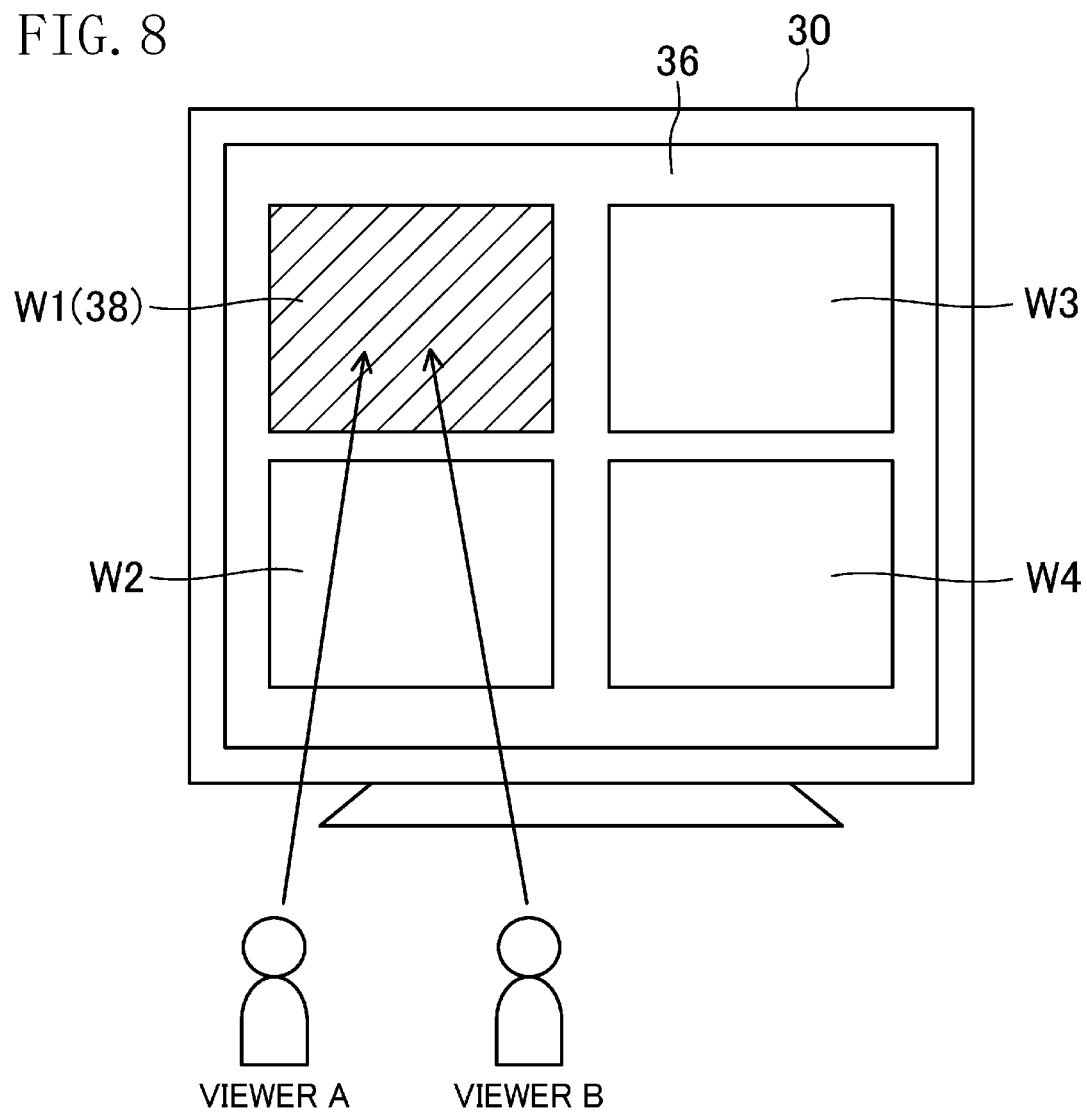
FIG. 8 illustrates how the first exemplary set of gaze and target regions may be viewed in another situation.

FIGS. 7 and 8 illustrate how a first exemplary set of gaze and target regions may be viewed. In the examples shown in FIGS. 7 and 8, multiple windows are displayed on the display unit 36.

For example, as illustrated in FIG. 7, suppose that multiple windows W1-W4 are displayed on the display unit 36, and viewers A and B have started to view the windows W1 and W4, respectively.

In this case, the windows W1 and W4 are gaze regions 37 (as indicated by the broken lines in FIG. 7), whereas the windows W2 and W3 are non-gaze regions. Thus, the windows W1 and W4 can be candidates for the target region, whereas the windows W2 and W3 are excluded from candidates for the target region.

In this state, if the viewers A and B continue watching the windows W1 and W4, respectively, the windows W1 and W4 are specified as the target regions.

On the other hand, as illustrated in FIG. 8, if the viewer B starts watching the window W1, the viewers A and B are both viewing the same gaze region, and thus, the window W1 is specified as a target region 38 (as indicated by the oblique lines in FIG. 8).

Second Example

Figure 9:
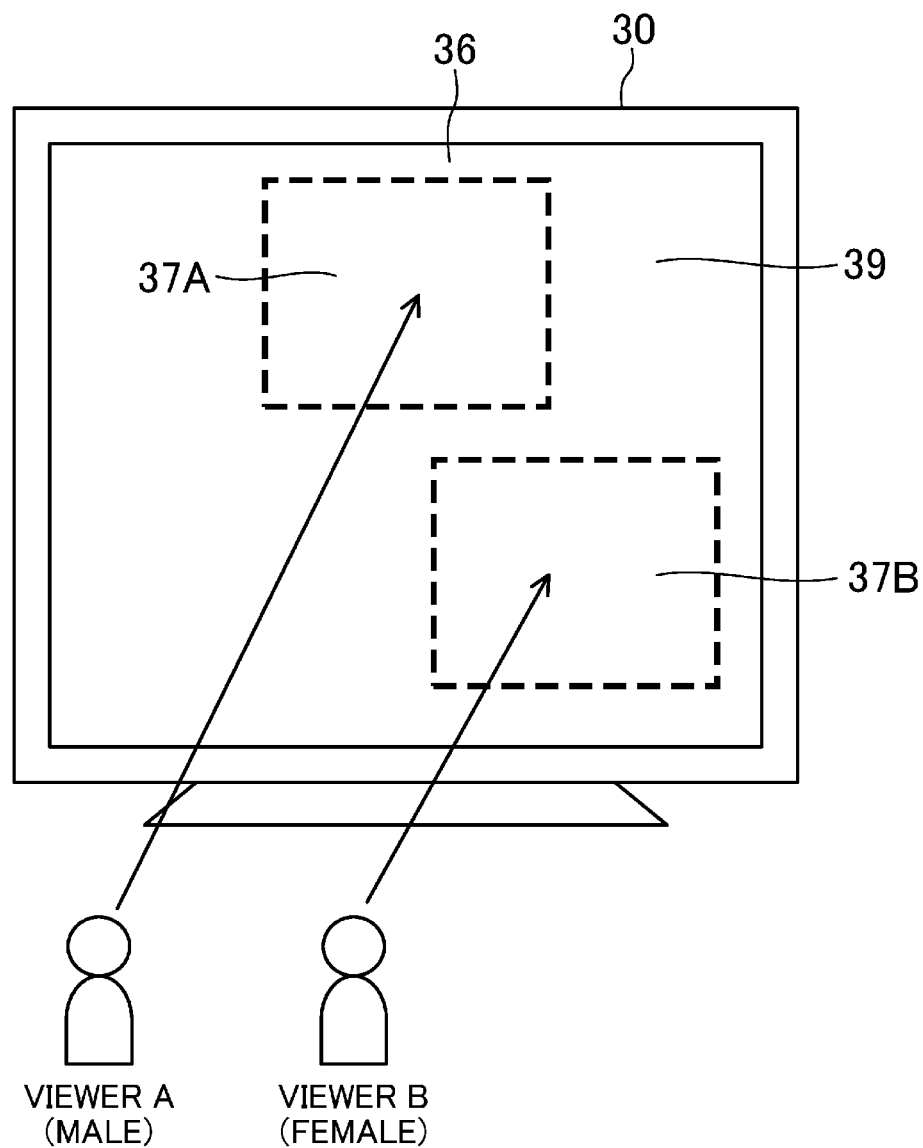
FIG. 9 illustrates how a second exemplary set of gaze and target regions may be viewed in one situation.
Figure 10:
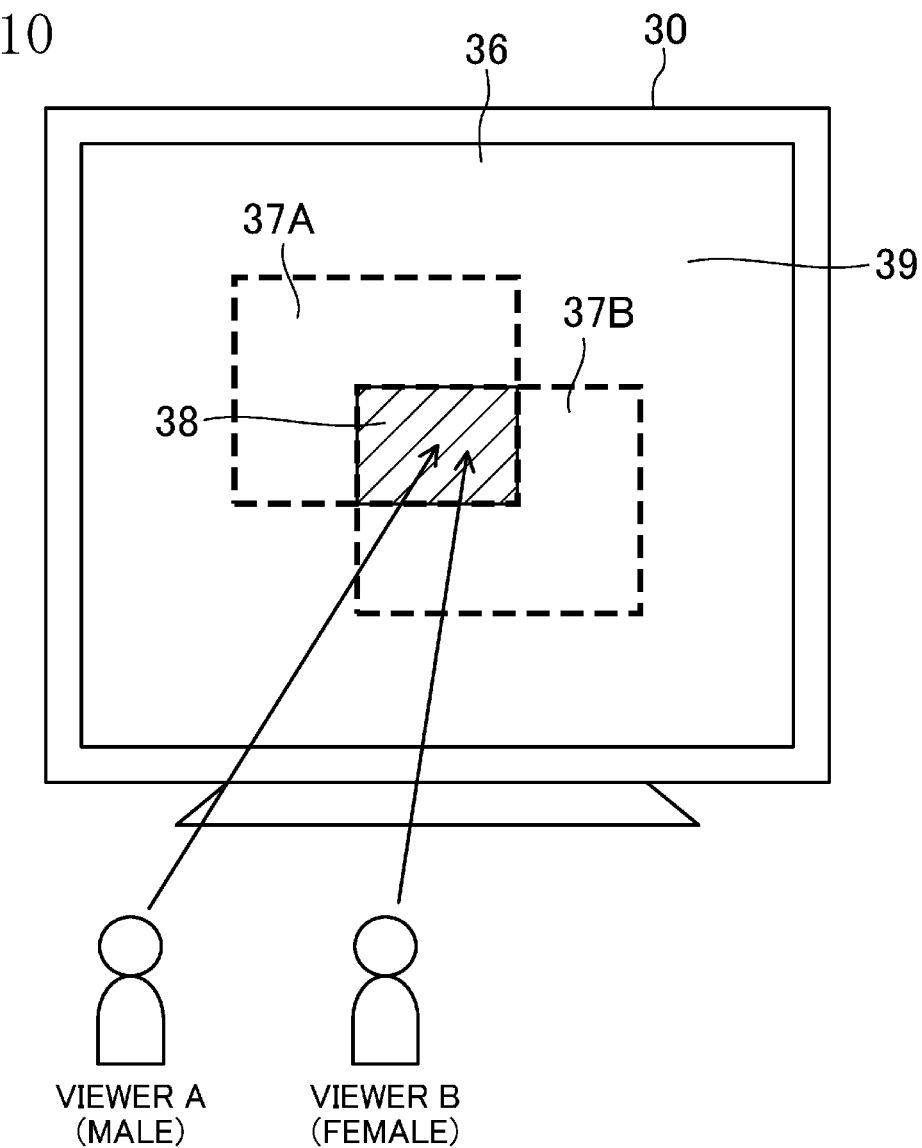
FIG. 10 illustrates how the second exemplary set of gaze and target regions may be viewed in another situation.

FIGS. 9 and 10 illustrate how a second exemplary set of gaze and target regions may be viewed. In the examples shown in FIGS. 9 and 10, a male viewer A and a female viewer B are watching arbitrary regions on the display unit 36.

For example, as illustrated in FIG. 9, suppose that the viewers A and B have started watching regions 37A and 37B, respectively, because of the difference in their interest, for example.

In this case, the regions 37A and 37B are respectively gaze regions 37A and 37B, and the other region on the display unit 36 is a non-gaze region 39.

In this state, if the viewers A and B fix their eyes on the same locations in the gaze regions 37A and 37B on the display unit 36 for a predetermined amount of time, for example, the gaze regions 37A and 37B are specified as the target regions.

On the other hand, if the gaze regions 37A and 37B have shifted to the locations illustrated in FIG. 10 because the objects of interest for the viewers A and B have moved, for example, the gaze regions 37A and 37B partially overlap with each other, and thus, their overlapping region (i.e., the region indicated by the oblique lines in FIG. 10) is specified as the target region 38.

Alternatively, in FIG. 10, a region covering the gaze regions 37A and 37B may also be specified as the target region 38.

Third Example

Figure 11:
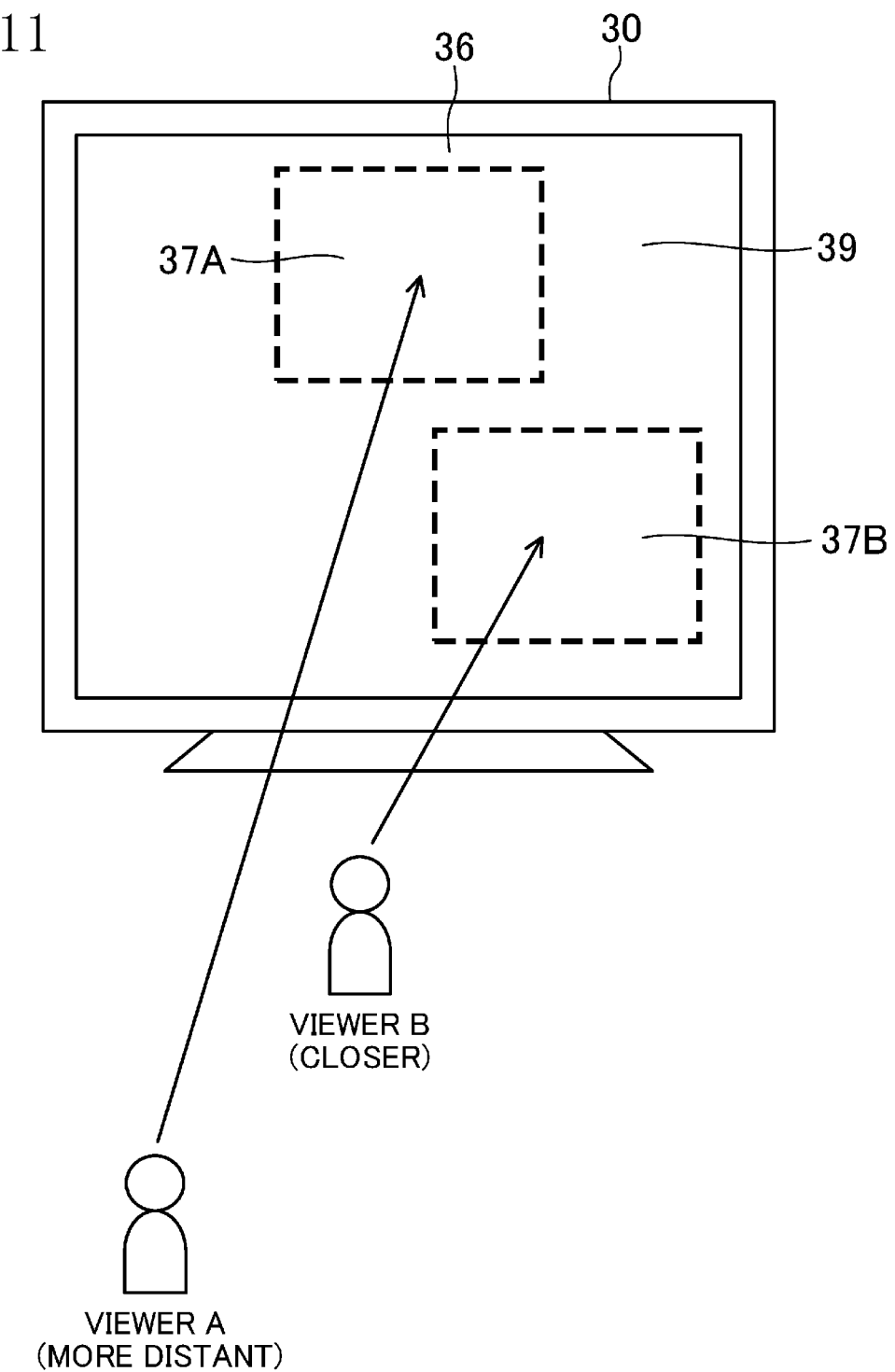
FIG. 11 illustrates how a third exemplary set of gaze and target regions may be viewed in one situation.
Figure 12:
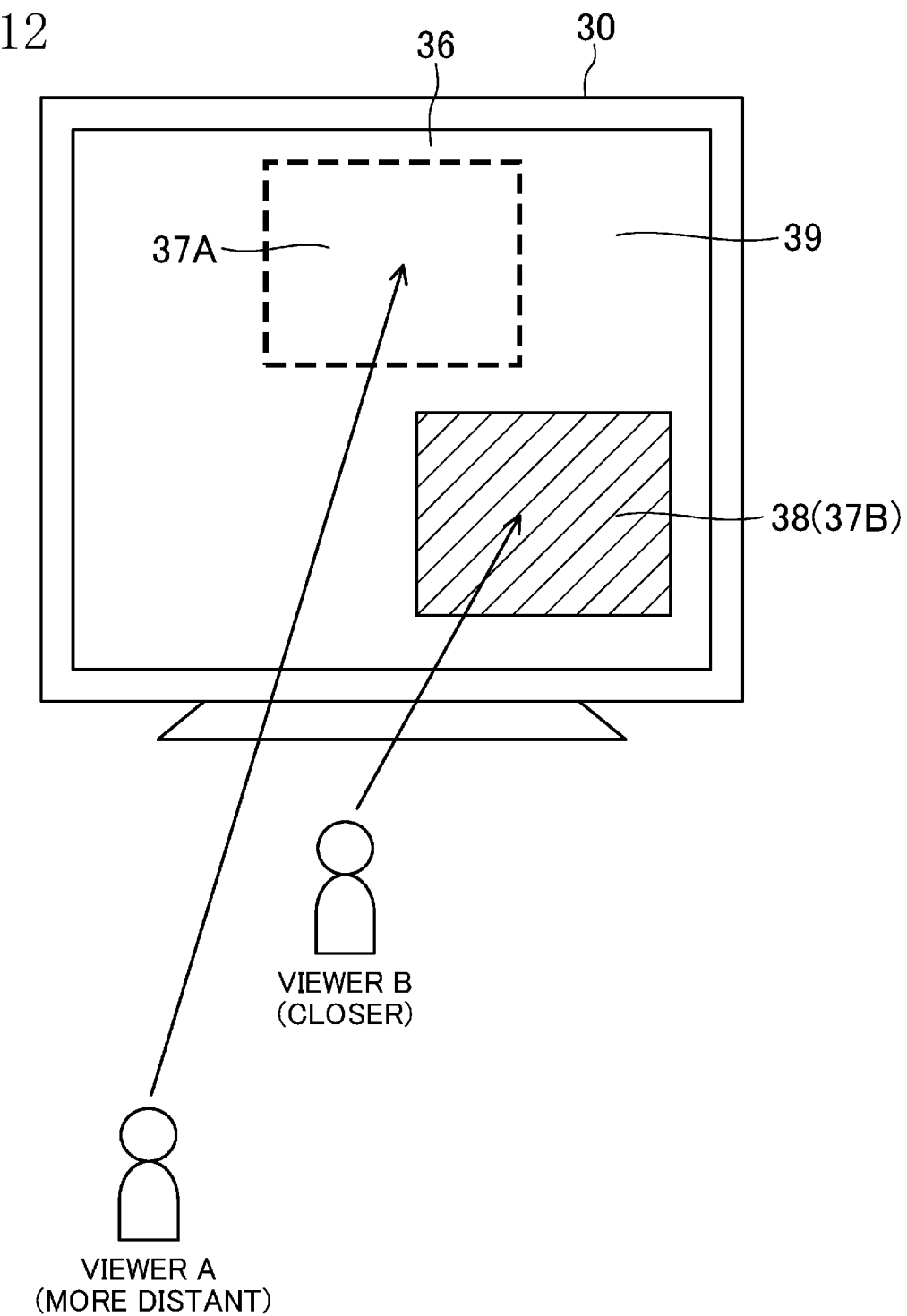
FIG. 12 illustrates how the third exemplary set of gaze and target regions may be viewed in another situation.

FIGS. 11 and 12 illustrate how a third exemplary set of gaze and target regions may be viewed. In the examples shown in FIGS. 11 and 12, the distance between the viewer A and the display device 30 is different from the distance between the viewer B and the display device 30.

For example, as illustrated in FIG. 11, suppose that the viewers A and B are watching the gaze regions 37A and 37B, respectively, from different positions.

The distance from the viewer A or B to the display device 30 may be measured by the distance measuring sensor 34 (see FIG. 6). Thus, if the viewer A is located at a longer distance from display device 30 than the viewer B is, the gaze region 37A may be excluded from candidates for the target region.

That is because it may be more difficult for a viewer located farther away from the display device 30 to sense improvement of the image quality than for a viewer located closer to the display device 30.

As a result, as illustrated in FIG. 12, the gaze region 37B being watched by the viewer B located closer to the display unit 36 is specified as the target region 38. Alternatively, if the viewer A has come closer to the display device 30, the gaze region 37A may also be specified as the target region 38. Still alternatively, if the viewer B has gone away from the display device 30, the gaze region 37B may also be excluded from candidates for the target region 38.

Yet alternatively, the gaze region being watched by the viewer located within a predetermined distance from the display device 30 may be specified as the target region, instead of the gaze region being watched by the viewer located closer to the display device 30.

In other words, the distance may be included in parameters for determining the target region.

Fourth Example

Figure 13:
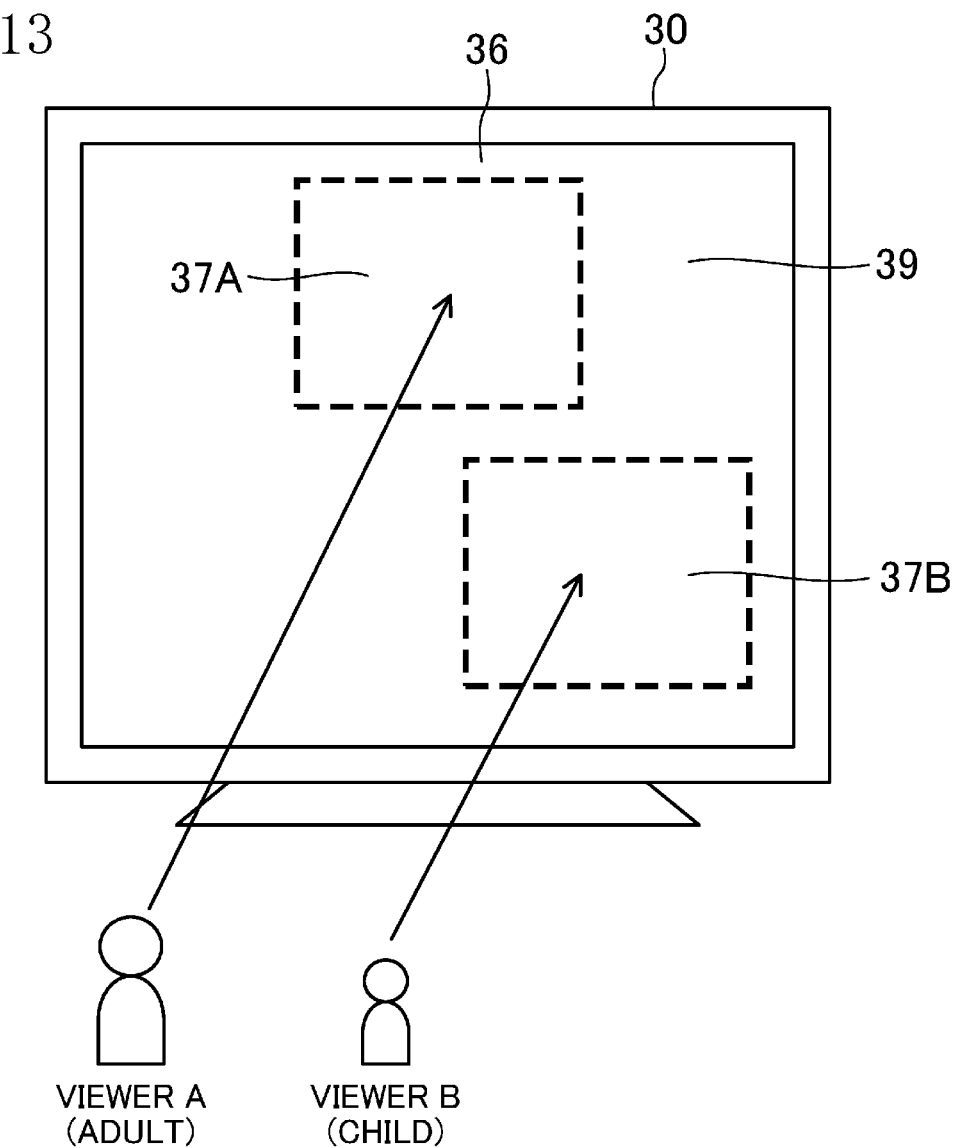
FIG. 13 illustrates how a fourth exemplary set of gaze and target regions may be viewed in one situation.
Figure 14:
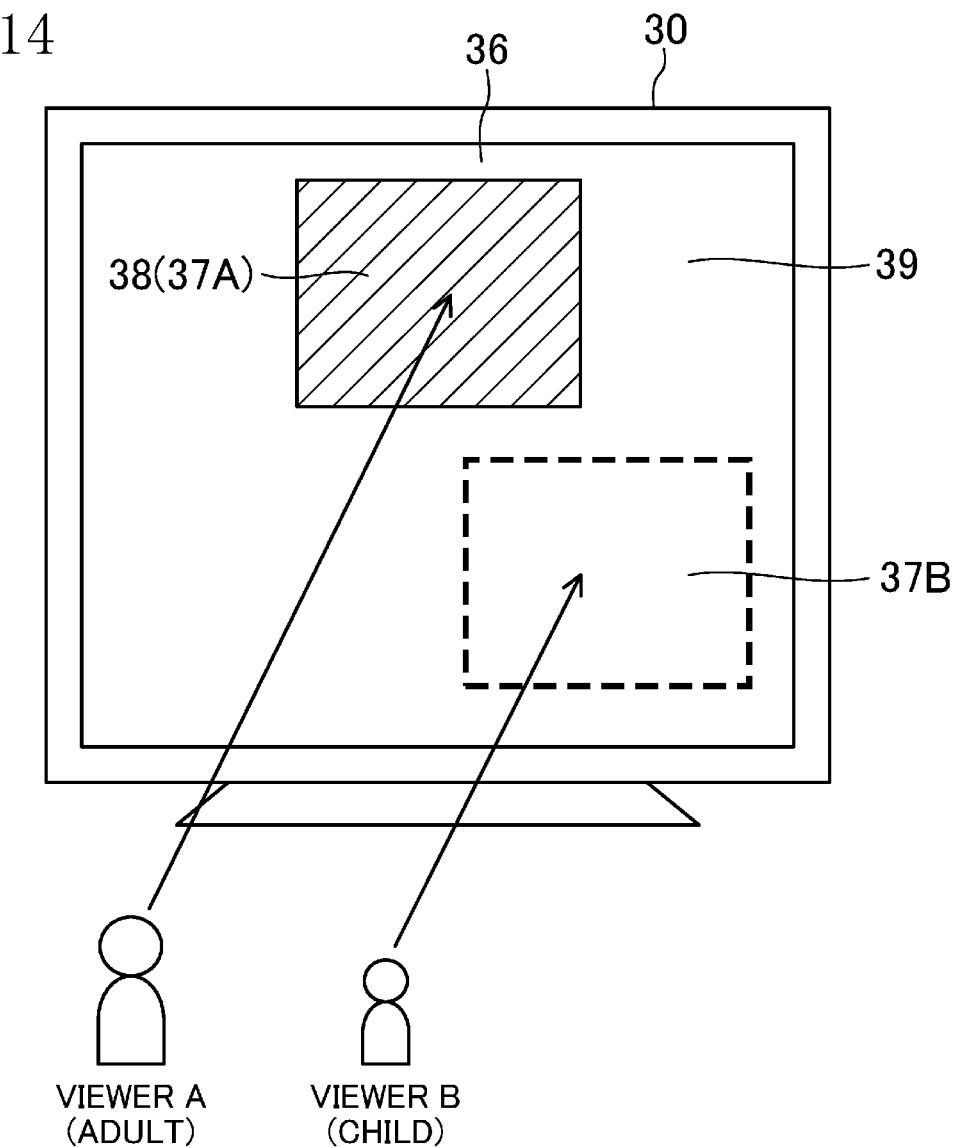
FIG. 14 illustrates how the fourth exemplary set of gaze and target regions may be viewed in another situation.

FIGS. 13 and 14 illustrate how a fourth exemplary set of gaze and target regions may be viewed. In the example shown in FIGS. 13 and 14, an adult viewer A and a child viewer B are watching arbitrary regions on the display unit 36.

For example, as illustrated in FIG. 13, suppose that the viewers A and B are watching the gaze region 37A and 37B, respectively.

In this case, as illustrated in FIG. 14, the gaze region 37A is specified as the target region 38, whereas the gaze region 37B is excluded from candidates for the target region. That is because an adult would sense an image of improved quality more easily than a child would.

As can be seen, in the first to fourth examples, subjecting the target region 38 to image quality improvement or any other type of image quality control provides at least one of the viewers A and B with an image, of which the quality has been controlled to his or her preference. In addition, the range to be subjected to the image quality control is narrower than the entire display unit 36. This leads to a reduction in power consumption and costs.

In the first to fourth examples, a decimation process may be performed on the non-gaze region 39. Alternatively, any two or more of the first to fourth examples may be arbitrarily combined with each other.

Optionally, settings of the image quality control of the target region may be adjusted with, e.g., a remote controller. If the target region includes a plurality of target regions, the specifics of the image quality controls of the respective target regions may be set independently of one another.

The image quality control does not have to be image quality improvement but may also be any other type of control as long as it is beneficial for the viewer. For example, the image may have its quality controlled by having its luminance, lightness, saturation, and/or hue adjusted or by having the edges of a person or any other object in the target region enhanced such that the image will look clearer to the viewer's eyes.

Moreover, the area of the target region may be expanded to display information about the person or any other object in the target region, or the image displayed within the target region may be zoomed in to make the target region more clearly visible to the viewer. Such relevant information may be displayed on a mobile terminal owned by the viewer.

Optionally, the controller 22 may correct the output of the region specifier 20 based on the image information supplied from the image generator 16. For example, the boundary or edges of the person or any other object in the image information may be detected, and the image information included in the target region may be corrected based on the data. The controller 22 may receive tag information indicating details of the persons and other objects included in the image information. In this case, the image information included in the target region may be corrected based on this tag information.

If the viewer is watching a plurality of gaze regions intermittently, the history of the cumulative gaze time of each of those gaze regions may be recorded, and a gaze region, of which the cumulative gaze time has reached a predetermined value, may be specified as the target region.

Moreover, the target region may also be specified in consideration of the order of viewing the image by plural viewers. Alternatively, the respective gaze regions, including a region in which some of the gaze regions overlap with one another, may be specified as the target regions.

For example, unalterable information such as the viewer's age or eyesight or the owner of the display device 30 may be entered with, e.g., a remote controller. For example, the gaze region being watched by a viewer who is elderly or has weak eyesight or the gaze region being watched by the owner may be preferentially specified as the target region.

In the second embodiment described above, the display device is configured as a digital TV set. However, the display device may also be any other device such as a personal computer or a projector as long as the device can display an image thereon.

A semiconductor integrated circuit according to the present disclosure may perform, even if a plurality of viewers are watching the same image on a display device, image quality improvement processing or any other image quality control on a region being watched by each of those viewers particularly attentively. Thus, this circuit is useful for display devices such as large-screen TV sets and monitors that need to have their power consumption and costs reduced.

What is claimed is:

1. A semiconductor integrated circuit for use in a display device, the circuit comprising an output unit, an information input unit, a viewer detector, a region specifier, and a controller, wherein
   the output unit outputs output image information to the display device,
   the information input unit receives viewer information about one or more viewers, in front of the display device, watching an image on a single screen of the display device, the image being displayed based on the output image information,
   the viewer detector is configured to detect (1) how many viewers are watching the image on the single screen of the display device and (2) one or more gaze regions within the image being watched by the detected one or more viewers, based on the viewer information from the information input unit,
   the region specifier is configured to specify, in response to detecting a plurality of viewers, a target region in the image based on a plurality of gaze regions being watched by the plurality of viewers,
   the controller is configured to perform image quality control on the target region, and output the image including the target region subjected to the image quality control as the output image information to the output unit,
   the viewer detector detects a distance between the one or more viewers and the display device displaying the image, and
   the region specifier specifies the target region in consideration of the distance detected by the viewer detector as well.

2. The semiconductor integrated circuit of claim 1, wherein
   the region specifier specifies, as the target region, an overlapping region in which two or more of the gaze regions overlap with each other at least partially.

3. The semiconductor integrated circuit of claim 1, wherein
   the controller performs image quality improvement processing as the image quality control.

4. A semiconductor integrated circuit for use in a display device, the circuit comprising an output unit, an information input unit, a viewer detector, a region specifier, and a controller, wherein
   the output unit outputs output image information to the display device,
   the information input unit receives viewer information about one or more viewers, in front of the display device, watching an image on a single screen of the display device, the image being displayed based on the output image information,
   the viewer detector is configured to detect (1) how many viewers are watching the image on the single screen of the display device and (2) one or more gaze regions within the image being watched by the detected one or more viewers, based on the viewer information from the information input unit,
   the region specifier is configured to specify, in response to detecting a plurality of viewers, a target region in the image based on a plurality of gaze regions being watched by the plurality of viewers,
   the controller is configured to perform image quality control on the target region, and output the image including the target region subjected to the image quality control as the output image information to the output unit, and
   if at least one of the gaze regions includes character information, the region specifier specifies the target region by excluding the at least one gaze region including the character information.

5. The semiconductor integrated circuit of claim 1, wherein
   if any of the one or more gaze regions remains at a fixed location within the image for a predetermined amount of time, the region specifier specifies the gaze region as the target region.

6. The semiconductor integrated circuit of claim 1, wherein
   the viewer detector detects the one or more viewers and the one or more gaze regions based on information acquired from an imaging device capturing an image including one or more viewers.

7. The semiconductor integrated circuit of claim 1, further comprising
   an image generator configured to generate the image.

8. A display device comprising the semiconductor integrated circuit of claim 1.

9. The semiconductor integrated circuit of claim 1, wherein
   if the gaze regions do not overlap with one another, the region specifier specifies the gaze regions as target regions.

10. The semiconductor integrated circuit of claim 9, wherein
    the controller performs, as the image quality control, multiple different types of image quality control on the gaze regions specified as the target regions.

11. The semiconductor integrated circuit of claim 10, wherein the multiple different types of image quality control are determined based on the viewer information.

12. A method of controlling a quality of an image, the method comprising:
   a1) outputting output image information, by an output unit, to a display device;
   a2) receiving viewer information about one or more viewers, in front of the display device, watching the image on a single screen of the display device, the image being displayed based on the output image information;
   a3) detecting that (1) how many viewers are watching the image on the single screen of the display device and (2) a plurality of gaze regions within the image being watched by the detected one or more viewers, based on the viewer information;
   b) specifying a target region in the image based on the plurality of gaze regions being watched by the plurality of viewers;
   c) performing image quality control on the target region; and
   d) outputting the image including the target region subjected to the image quality control as the output image information to the output unit,
   wherein a3) includes detecting a distance between the one or more viewers, and
   wherein b) includes specifying the target region in consideration of the distance detected by the viewer detector as well.

13. The method of claim 12, wherein
   c) includes performing image quality improvement processing as the image quality control.

14. The method of claim 12, wherein
   b) includes specifying, if the gaze regions do not overlap with one another, the gaze regions as the target regions.

15. The semiconductor integrated circuit of claim 1, further comprising:
   an interface configured to output the image including the target region subjected to the image quality control to the display device.

16. The semiconductor integrated circuit of claim 1, wherein
   the display device is a single display device, and
   the one or more viewers see the images displayed on the single display device.

17. The method of claim 12, wherein
   c) includes emphasizing an edge of an image within the target region.

18. The method of claim 12, wherein
   c) includes increasing a display magnification of the image within the target region.

19. The method of claim 12, wherein
   c) includes transmitting information about the image displayed within the target region to a mobile terminal the viewers own.

* * * * *